Oct. 16, 1956 G. P. KRAUSE 2,766,878
FORMING MACHINE
Filed Sept. 20, 1952 4 Sheets-Sheet 1

INVENTOR.
GERHARD P. KRAUSE
BY
Pollard and Johnston

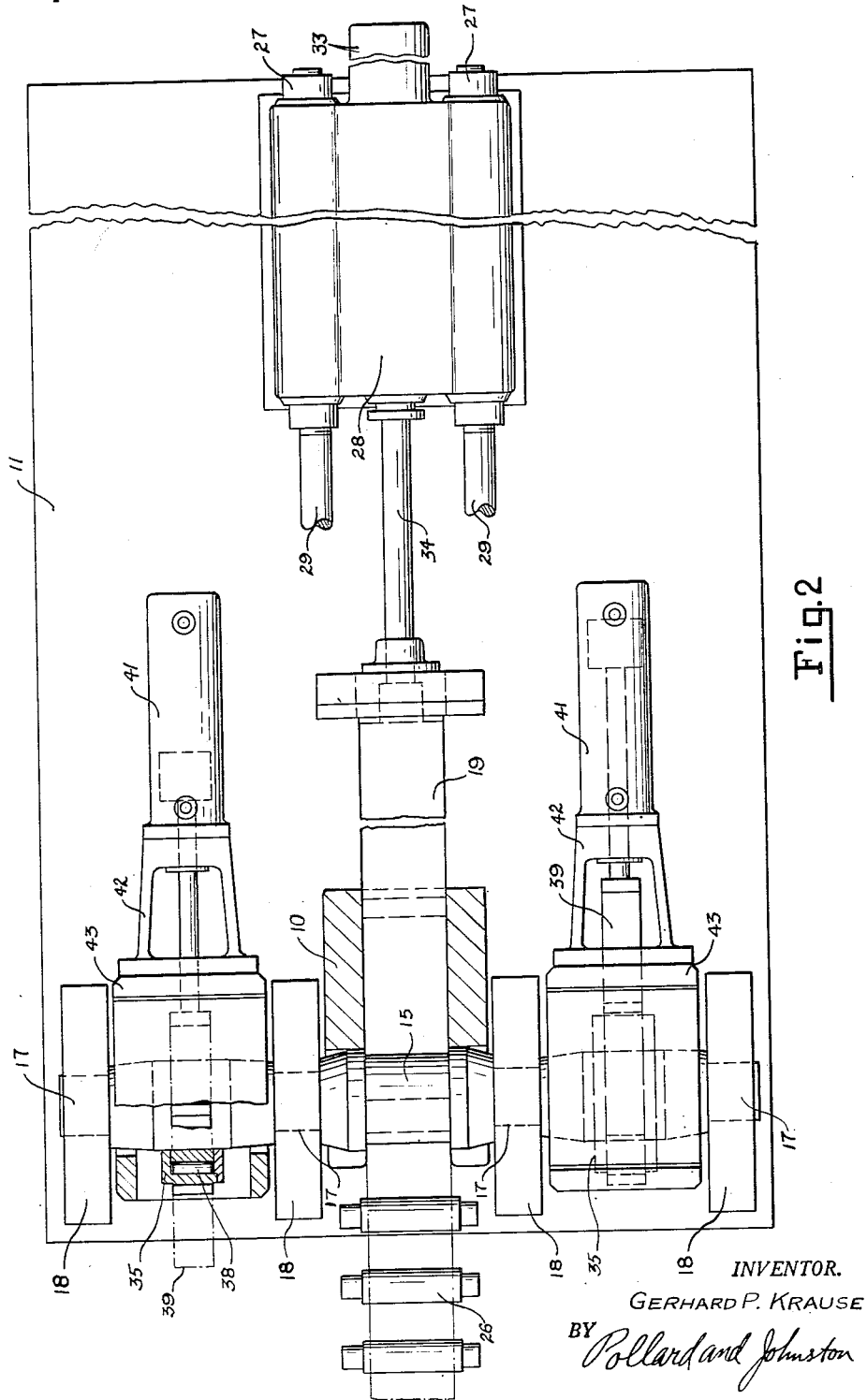

Oct. 16, 1956 G. P. KRAUSE 2,766,878
FORMING MACHINE
Filed Sept. 20, 1952 4 Sheets-Sheet 3
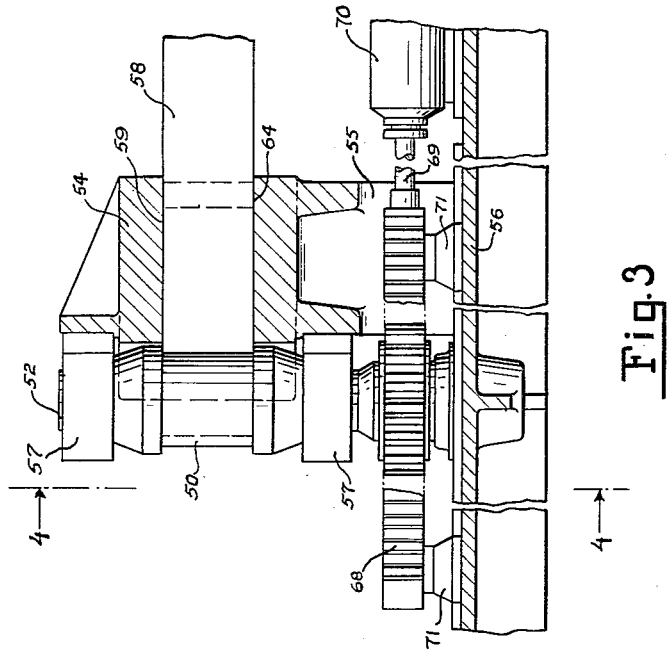
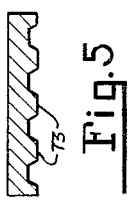
Fig.5
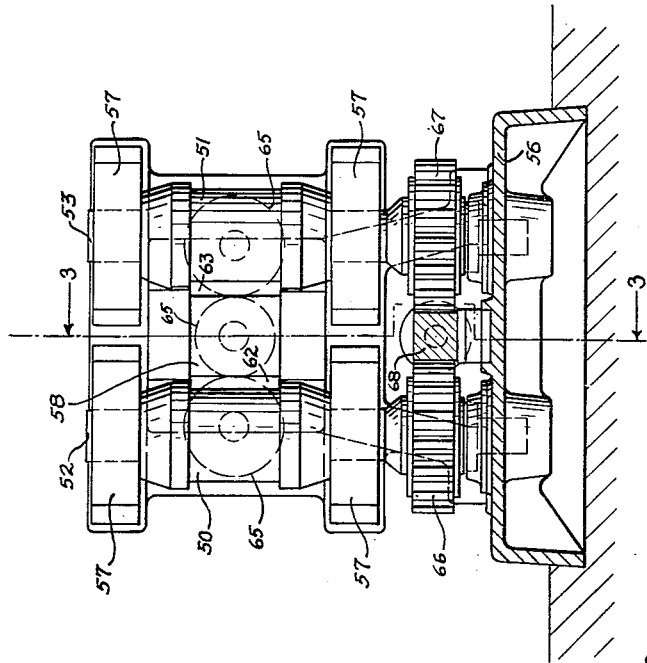
INVENTOR.
GERHARD P. KRAUSE
BY Pollard and Johnston

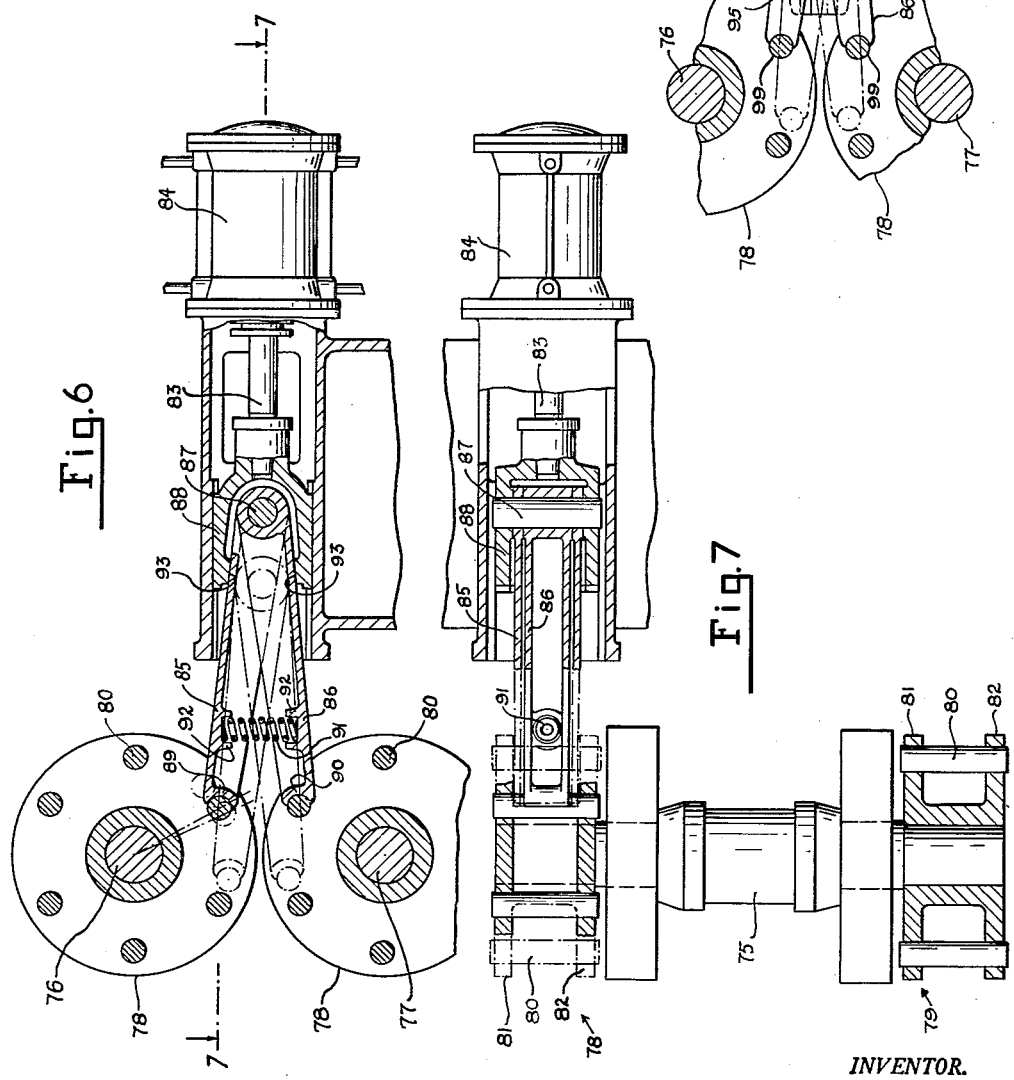

United States Patent Office 2,766,878
Patented Oct. 16, 1956

2,766,878
FORMING MACHINE

Gerhard P. Krause, Harrison, N. Y., assignor, by mesne assignments, to Baldwin-Lima-Hamilton Corporation, Philadelphia, Pa., a corporation of Pennsylvania Application September 20, 1952, Serial No. 310,631

6 Claims. (Cl. 207—2)

This invention relates to improvements in hydraulically operated extrusion apparatus and more particularly to a combined rolling and pressing arrangement with power operated driving mechanism.

One of the objects of this invention is to provide a combined rolling and pressing apparatus for extruding material, particularly for forming material having a non-uniform section.

According to this invention, an extrusion apparatus is provided in which the material to be extruded is forced through orifices or openings formed between opposed, power-driven rotatable rollers and a die movable between and relative to the rollers so that the rollers themselves, together with pressure exerted at the rear of the material, force the material through such orifices while the forces exerted by the rollers on the die are balanced. The die moved between the rollers is interchangeable and may be shaped so as to produce a shaped extruded material, i. e. the die may be ribbed or tapered to produce, respectively, a ribbed or tapered product. Likewise, the roller may have various forms to effect desired surface contours of the material extruded. Thus, by forcing the material through orifices formed between movable opposed driven rollers and a movable die, the material may be shaped accurately during extrusion, and such shaping may be readily varied on the same extrusion machine because the die is easily interchanged.

Another feature of this invention is the provision of driving arrangements to rotate the rollers so that fixed or predetermined ratios between the peripheral speed of the rollers and the linear speed of the die may be maintained.

Other objects, features and advantages of the invention will become apparent from the following detailed description and the accompanying drawings showing illustrative embodiments of the invention.

In the drawings:

Figure 2 is a plan view, partly in section, of the embodiment of Figure 1.

Figure 3 is a fragmentary vertical section, taken along line 3—3 of Figure 4, showing another embodiment of the invention.

Figure 4 is a front vertical section, partly broken away, taken approximately along line 4—4 of Figure 3.

Figure 5 is a cross sectional view of product which can be made according to the invention.

Figure 6 is a fragmentary sectional elevation of a further embodiment of the invention, showing by full and by broken lines different positions of the pawl relative to the rollers.

Figure 7 is a horizontal section approximately along line 7—7 of Figure 6.

Figure 8 is a fragmentary sectional elevation showing an alternative form of roller driving means.

Figure 1:
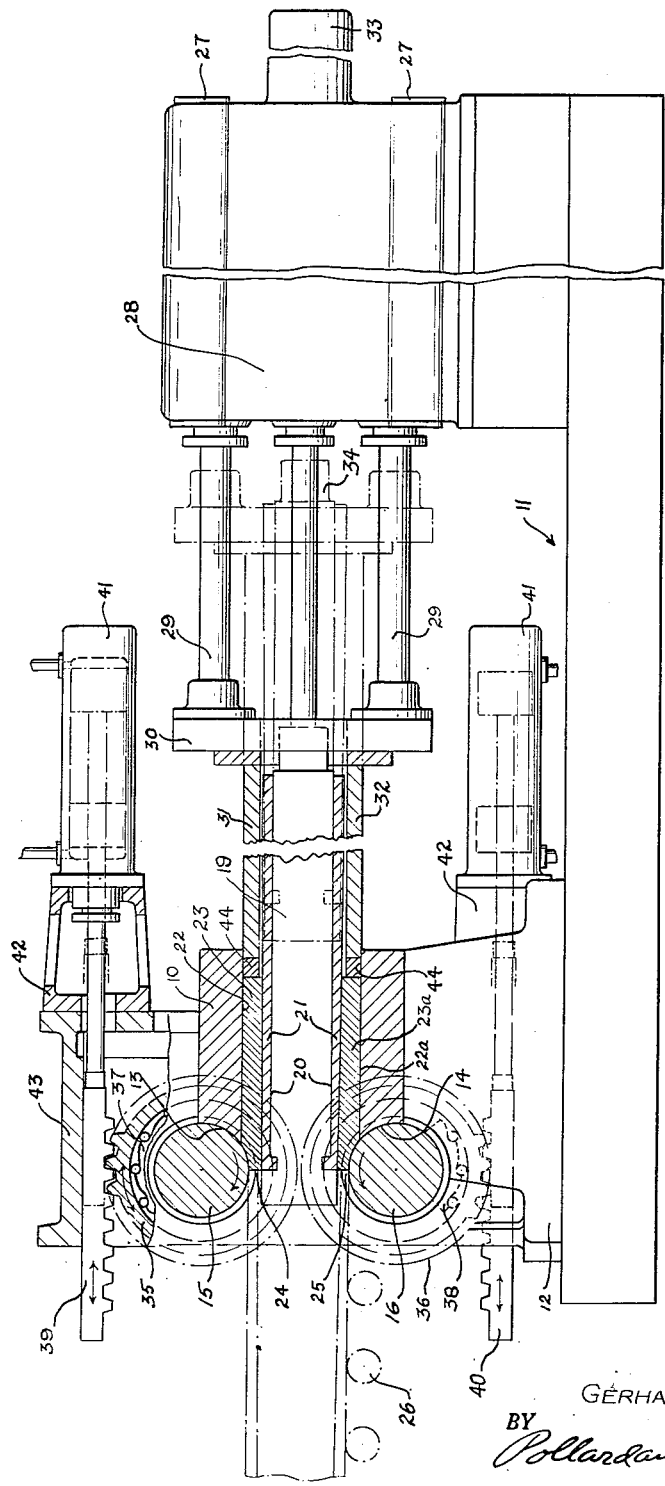
Figure 1 is a fragmentary sectional elevation of one embodiment of the invention, showing by full and by broken lines different positions of the driving members of the apparatus.

Referring to Figures 1 and 2, hollow billet container 10 is supported on a main bed 11 by an upright 12. The rear end of the container is recessed at 13 and 14 to receive rollers 15 and 16, respectively, the peripheral surface of each roller preferably extending inwardly beyond the inner edge of the respective part in which the roller is mounted. In this form of the invention, the rollers are rotated about a horizontal axis and are supported by bearings 17 (Figure 2) mounted in uprights 18 which are also supported by main bed 11. A die carrier 19 is movable within the hollow billet container 10 and between the rollers 15 and 16. The width of the die carrier corresponds substantially to the width of the opening in the billet container so that the vertical sides of the die carrier move along the inner vertical side walls of the billet container. The horizontal sides of the carrier are spaced from the inner top and bottom walls of the container and are also recessed at 20 to receive a die 21 in each side so that the die and die carrier together with the inner walls of the container form cavities 22 and 22a for receiving billets 23 and 23a. The sides of the carrier containing the die are also spaced from the peripheral edges of rollers 15 and 16 as the die passes therebetween to form extruding orifices or openings 24, 25. On the side of the forming rollers remote from the billet container, supporting rollers 26, schematically shown in Figure 1, are arranged to support the die carrier and the extruded material as they move beyond the rollers.

Extrusion stem operating cylinders 27 are mounted in a frame 28 supported on the main bed 11 spaced from the end of the billet container remote from rollers 15 and 16 to allow ample room for loading the billet container. Cylinders 27 have rams 29 connected to a movable crosshead 30 carrying extrusion stems 31 and 32 which cooperate with the billet container cavities 22 and 22a, respectively.

Also mounted in the frame 28 is a die carrier operating cylinder 33 which has a ram 34 connected to the die carrier 19 for moving the die carrier together with the die in a rectilinear path relative to the billet container and between rollers 15 and 16.

Rollers 15 and 16 are rotated at such speeds that a predetermined ratio may be maintained between the peripheral speed of the rollers and the linear speed of the die carrier. Preferably, the torque exerted by these rollers must be substantially constant and relatively high.

In order to satisfy these conditions, a pair of pinions 35 can be rotatably mounted on roller 15 through overrunning clutches 37 and a pair of pinions 36 can be rotatably mounted on roller 16 through overrunning clutches 38, clutches 37 transmitting clockwise motion only of the pinions 35 to roller 15 and clutches 38 transmitting counterclockwise motion only of the pinions 36 to the roller 16. A pair of racks 39 engage pinions 35 while another pair of racks 40 engage pinions 36, the racks of each pair being arranged to be reciprocated 180° out of phase with each other by main cylinders 41 supported by brackets 42 fixed to uprights 43 on the main bed 11. Accordingly, since the racks are reciprocated, the clutches 37 and 38 transmit torque to the rollers during one stroke of each rack, but since the two racks in driving relation to each roller are reciprocated 180° out of phase with each other, constant torque and continuous rotary motion are transmitted to each roller.

Summarizing the operation of the combined rolling and pressing apparatus thus far, the die carrier 19 is initially in a position shown in broken lines in Figure 1. Hydraulic pressure is applied in the carrier operating cylinder 33 to move the ram 34, together with the die carrier 19, into the billet container 10 so that the die carrier and die will form with the internal walls of the billet container cavities 22 and 22a. The billets are then loaded into these cavities and are carried by the die carrier toward the rollers 15 and 16. The extrusion operating cylinders 27 actuate extruding rams 29, together with the crosshead 30, to drive the extrusion stems 31 and 32 against pusher blocks 44 placed behind the billet to move the material in the cavities through the orifices formed between the die carrier and the rollers. Then, the peripheral surfaces of the rollers 15 and 16, driven as set forth hereinabove and to which high torques are applied by the driving means, engage respectively the billets in cavities 22 and 22a so that the main force driving the material through the orifices is applied by the rollers and extrusion rams. The torque of the rollers is maintained relatively constant and the ratio between the peripheral speed of the rollers and the linear speed of the die carrier is also maintained constant so that each extruding operation may be performed under uniform conditions.

Another driving mechanism for continuous rotary motion of the rollers comprises a pair of pinions mounted on each roller and driven respectively by a pair of reciprocating racks 180° out of phase with each other. Each pinion through an overrunning clutch may drive a gear on the respective roller, which intermeshes with a gear on the other roller, one of said clutches transmitting clockwise rotation only of one pinion to one roller and the other transmitting counterclockwise rotation only of the other pinion to the other roller so that one rack will transmit motion and torque to both rollers during 180° rotation of the rollers and the other rack will transmit motion and torque to both rollers during the other 180° rotation of the rollers.

Figures 3 and 4 show another embodiment of the invention. Spaced rollers 50 and 51 are mounted to rotate respectively on vertical shafts 52 and 53 which are positioned at one end of the billet container 54. The billet container 54 is supported on an upright 55 fixed to a main bed 56 while the roller shafts 52 and 53 are supported in bearings mounted in brackets 57 fixed to the upright 55. A die carrier 58 is movable in an opening 59 of the billet container 54 and between the spaced rollers 50 and 51, the vertical walls of the die carrier with the internal walls of the billet container forming cavities for receiving material to be extruded and with the surfaces of the rollers forming orifices 62 and 63. In this embodiment, the lower side 64 of the die carrier is slidably supported on the lower internal surface of the billet container so that the billet container itself provides the necessary support for the die carrier, and the supporting rollers required in the embodiment shown in Figure 1 are unnecessary. Die means (not shown) can be mounted on the die carrier in the same manner as shown in Figure 1 and these members also can be driven in the same manner in Figure 1. Such driving means are shown in phantom lines at 65.

In the driving arrangement illustrated in Figures 3 and 4, pinions 66 and 67 are mounted in a horizontal plane on the vertical shafts 52 and 53. Overrunning clutches as shown in the embodiment of Figure 1 may be used but are not necessary in this embodiment when short articles are formed. The pinions are driven by a rack 68 on one end of a ram 69 which is reciprocated in a path medially of the two rollers by a ram operating cylinder 70 on the main bed 56. The rack is provided with teeth on opposite sides thereof so that the rack may engage and drive both pinions. The rack is supported on guides 71 fixed to the bed 56 on each side of the pinions and is of sufficient length so that a complete extruding operation may be performed by one stroke of the rack. It is to be understood that longer articles can be formed by using the roller drive means of Figure 1.

It should be realized at this point that the die which is mounted in the die carrier in all embodiments of the invention is interchangeable with dies having other shapes so that a single rolling and pressing apparatus is adapted to receive dies of many different shapes. For example, the die may be tapered, ribbed longitudinally or transversely, or preformed to any shape desired to be imparted to the extruding material. Merely as an example, an article having ribs 73 as seen in Figure 5 can be formed.

Figures 6 and 7 show still another driving arrangement for applying a substantially constant torque to the rollers. Roller 75 and a second roller (not shown) are fixed respectively to roller shafts 76 and 77. Each shaft has fixed thereon two ratchet wheels, generally indicated at 78 and 79, each of which has a plurality of circumferentially arranged studs or pins 80 extending transversely between the pair of discs 81 and 82 fixed to the shafts. Since both ratchet wheels are driven in the same manner, only one drive has been shown although it should be noted that the wheels are driven alternately and that rotation of one wheel not only turns the roller shaft but also the other wheel thereby positioning a stud of the other wheel for engagement with its driving member before this one wheel is disengaged from its driving member.

The ratchet wheel 78 on each shaft is arranged to form with the corresponding wheel on the other shaft a pair of vertically aligned wheels in order that one driving member can drive both wheels. Ratchet wheels 79 are similarly arranged. The driving member consists of a roller driving ram 83 reciprocated to and from the wheels 78 by a ram operating cylinder 84 and a clutch member permitting the one ram to drive the two wheels during its driving stroke toward the rollers and to be disengaged therefrom during its return stroke away from the rollers. The clutch member includes a pair of relatively movable pawls 85 and 86 rotatably mounted on a pin 87 which is supported in a yoke 88 carried by the ram 83 at one end thereof. The free ends of the pawls 85 and 86 have detents 89 and 90 thereon for drivingly engaging the studs 80 and are normally urged away from each other by the spring 91 retained in dished bosses 92 on the inner surface of each pawl. Stops 93 integral with the yoke 88 limit the movement of the pawls relative to each other. At the beginning of the driving stroke of the ram, each detent 89 and 90 is in position to engage one of the studs 80 on each of the wheels 78 to push that stud forward through an arcuate path as the ram moves toward the roller so as to rotate the wheel and the roller until the engaged stud passes the center line of the two rollers. As the studs move away from this center line, the ram reaches the end of its stroke and becomes disengaged from the stud whereupon the pawls are forced apart again to their normally extended position in which they abut the stops 93.

The operation of this driving arrangement is as follows: the ram operating cylinders 84 reciprocate the two roller driving rams (83) 180° out of phase with each other in directions toward and away from the rollers. As each ram is moved in the direction of the rollers, the pawls 85 and 86 thereon engage studs 80 on one pair of vertically aligned wheels 78 and push the studs forward in an arcuate path to rotate these wheels and the rollers. As the ram reaches the end of this driving stroke and is about to begin its return stroke, the other ram engages studs on the other pair of vertically aligned wheels 79 to push these studs forward in an arcuate path to continue rotation of these wheels and the rollers.

Figure 8 shows a pawl and ratchet drive similar to that of Figures 6 and 7 wherein the relative angular movement of the pawls 85 and 86 is controlled by a cam member 94 which is fixed to upright 100 and has cam slots 95 and 96 in which cam followers 97 and 98 on pawls 86 and 85 are respectively guided. The pawls 86 and 85 may have recesses 99 for engaging the stud on the ratchet wheels.

It is to be understood that the detailed description and

What is claimed is:

1. In a material forming apparatus or the like, material containing means having walls defining an opening therethrough, forming rollers located adjacent one end of said material containing means, power-operated means driving said forming rollers, die carrier means movable in said material containing means and between said rollers, a plurality of die means located on opposite sides of said carrier means and movable therewith, the non-die carrying sides of said carrier means engaging the inner walls of said material containing means at opposite sides thereof to form material receiving cavities between the die carrying sides of said carrier means and the remaining inner walls of said material containing means, and means for exerting pressure on billets of material to be formed located in said cavities as said carrier means is moved to cause said billets to move with said die means and to pass through extrusion orifices formed by said rollers and said die means.

2. In a material forming apparatus or the like, material containing means having walls defining an opening therethrough, forming rollers located adjacent one end of said material containing means, die carrier means movable in said material containing means and between said rollers, a plurality of die means located respectively on opposite sides of said carrier means and movable therewith, the non-die carrying sides of said carrier means engaging the inner walls of said material containing means at opposite sides thereof to form material receiving cavities between the die carrying sides of said carrier means and the remaining inner walls of said material containing means, means for exerting pressure on billets of material to be formed located in said cavities as said carrier means is moved to cause said billets to move with said die means and to pass through extrusion orifices formed by said rollers and said die means, reciprocating fluid pressure operated means in driving relation to said rollers, and means connected with said rollers in driving engagement with said fluid pressure operated means for translating the reciprocatory motion of said fluid pressure operated means into rotary motion of said rollers.

3. In a material forming apparatus or the like, material containing means having walls defining an opening therethrough, forming rollers located adjacent one end of said material containing means, die carrier means movable in said material containing means and between said rollers, a plurality of die means located respectively on opposite sides of said carrier means and movable therewith, the non-die carrying sides of said carrier means engaging the inner walls of said material containing means at opposite sides thereof to form material receiving cavities between the die carrying sides of said carrier means and the remaining inner walls of said material containing means, means for exerting pressure on billets of material to be formed located in said cavities as said carrier means is moved to cause said billets to move with said die means and to pass through extrusion orifices formed by said rollers and said die means, a pair of reciprocating racks in driving relation to each roller and moving 180° out of phase with each other, fluid pressure means driving said racks, and connecting means on each of said rollers for alternately connecting the racks with the rollers in driving relation thereto, so that each roller is alternately driven by one of the racks to effect continuous rotary motion of the rollers, said connecting means including pinion means intermeshing with each rack and overrunning clutch means connecting each pinion to a roller only during rotation of said pinion in one direction.

4. In a material forming apparatus or the like, material containing means having walls defining an opening therethrough, forming rollers located adjacent one end of said material containing means, die carrier means movable in said material containing means and between said rollers, a plurality of die means located respectively on opposite sides of said carrier means and movable therewith, the non-die carrying sides of said carrier means engaging the inner walls of said material containing means at opposite sides thereof to form material receiving cavities between the die carrying sides of said carrier means and the remaining inner walls of said material containing means, means for exerting pressure on billets of material to be formed located in said cavities as said carrier means is moved to cause said billets to move with said die means and to pass through extrusion orifices formed by said rollers and said die means, a pair of reciprocating rams in driving relation to said rollers and moving 180° out of phase with each other, a pair of ratchet wheels on each roller, each ram having two relatively movable pawls pivoted thereto for simultaneous engagement, respectively, with one of the ratchet wheels on each roller, so that each roller is alternately driven by one of said rams to effect a continuous rotary motion of both rollers, and means to vary the angular relation of the two pawls on each ram to permit one pawl to move one roller clockwise and the other to move the other roller counterclockwise.

5. In a material forming apparatus as claimed in claim 4, wherein the means to vary the angular relation of the two pawls comprises a spring urging the two pawls away from each other.

6. In a material forming apparatus as claimed in claim 4, wherein the means to vary the angular relation of the two pawls comprises a stationary cam, and cam followers on each of said pawls cooperating with said cam to control the angular movement of the pawls.

References Cited in the file of this patent

UNITED STATES PATENTS

| | | |
|---|---|---|
| 862,475 | Haywood | Aug. 6, 1907 |
| 1,199,080 | Jones | Sept. 26, 1916 |
| 1,440,007 | Freeman et al. | Dec. 26, 1922 |
| 2,026,979 | Jones | Jan. 7, 1936 |
| 2,291,670 | Wiley et al. | Aug. 4, 1942 |
| 2,382,177 | Schanz | Aug. 14, 1945 |
| 2,593,469 | Mason | Apr. 22, 1952 |
| 2,602,959 | Fenlin | July 15, 1952 |

FOREIGN PATENTS

| | | |
|---|---|---|
| 387,601 | Great Britain | Feb. 13, 1933 |
| 594,215 | Germany | Mar. 19, 1934 |
| 955,901 | France | July 4, 1949 |